US005402243A

United States Patent [19]

Ryu

[11] Patent Number: 5,402,243
[45] Date of Patent: Mar. 28, 1995

[54] REGENERATING CIRCUIT OF SYNCHRONIZING SIGNALS FOR STANDARD VIDEO SIGNALS

[75] Inventor: Kyeong K. Ryu, Seoul, Rep. of Korea

[73] Assignee: Samsung Electronics Co., Ltd., Rep. of Korea

[21] Appl. No.: 828,758

[22] Filed: Jan. 31, 1992

[30] Foreign Application Priority Data

Jan. 31, 1991 [KR] Rep. of Korea ............... 91-1823

[51] Int. Cl.⁶ ............... H04N 9/44; H04N 9/45; H04N 5/06
[52] U.S. Cl. .................. 358/17; 348/505; 348/521; 348/536
[58] Field of Search ............ 358/17, 18, 19, 148, 358/149, 150, 151, 152, 153, 154, 156, 157, 158, 159, 319; H04N 9/44, 5/04, 9/45, 9/455, 5/06

[56] References Cited

U.S. PATENT DOCUMENTS

| | | | |
|---|---|---|---|
| 4,636,861 | 1/1987 | Willis | 358/150 |
| 4,737,849 | 4/1988 | Bauduin | 358/153 |
| 4,769,704 | 9/1988 | Hirai et al. | 358/150 |
| 5,043,813 | 8/1991 | Christopher | 358/158 |

Primary Examiner—James J. Groody
Assistant Examiner—Michael H. Lee
Attorney, Agent, or Firm—Sughrue, Mion, Zinn, Macpeak & Seas

[57] ABSTRACT

A synchronizing signal regenerating circuit for standard video signals in a digital video signal processing system includes a circuit for regenerating stable horizontal synchronizing signals, a circuit for generating double horizontal synchronizing signals, a circuit for generating horizontal synchronizing signals, a circuit for generating vertical synchronizing signals and an output circuit. The circuit for regenerating stable horizontal synchronizing signals regenerates the horizontal synchronizing signals in response to quadruple burst signals, and the circuit for generating double horizontal synchronizing signals is connected to the output terminal of the circuit for regenerating stable horizontal synchronizing signals. The circuit for generating horizontal synchronizing signals is connected to an output terminal of the circuit for regenerating stable horizontal synchronizing signals. The circuit for generating vertical synchronizing signals generates those signals from the input vertical synchronizing signals. The synchronizing signal generating circuit of the present invention can be incorporated into digital video signal processing systems, making it possible to eliminate a sample ratio converting circuit. As a result, the total system for video signal processing can be miniaturized and, thus, constructed in a light weight and compact form.

12 Claims, 2 Drawing Sheets

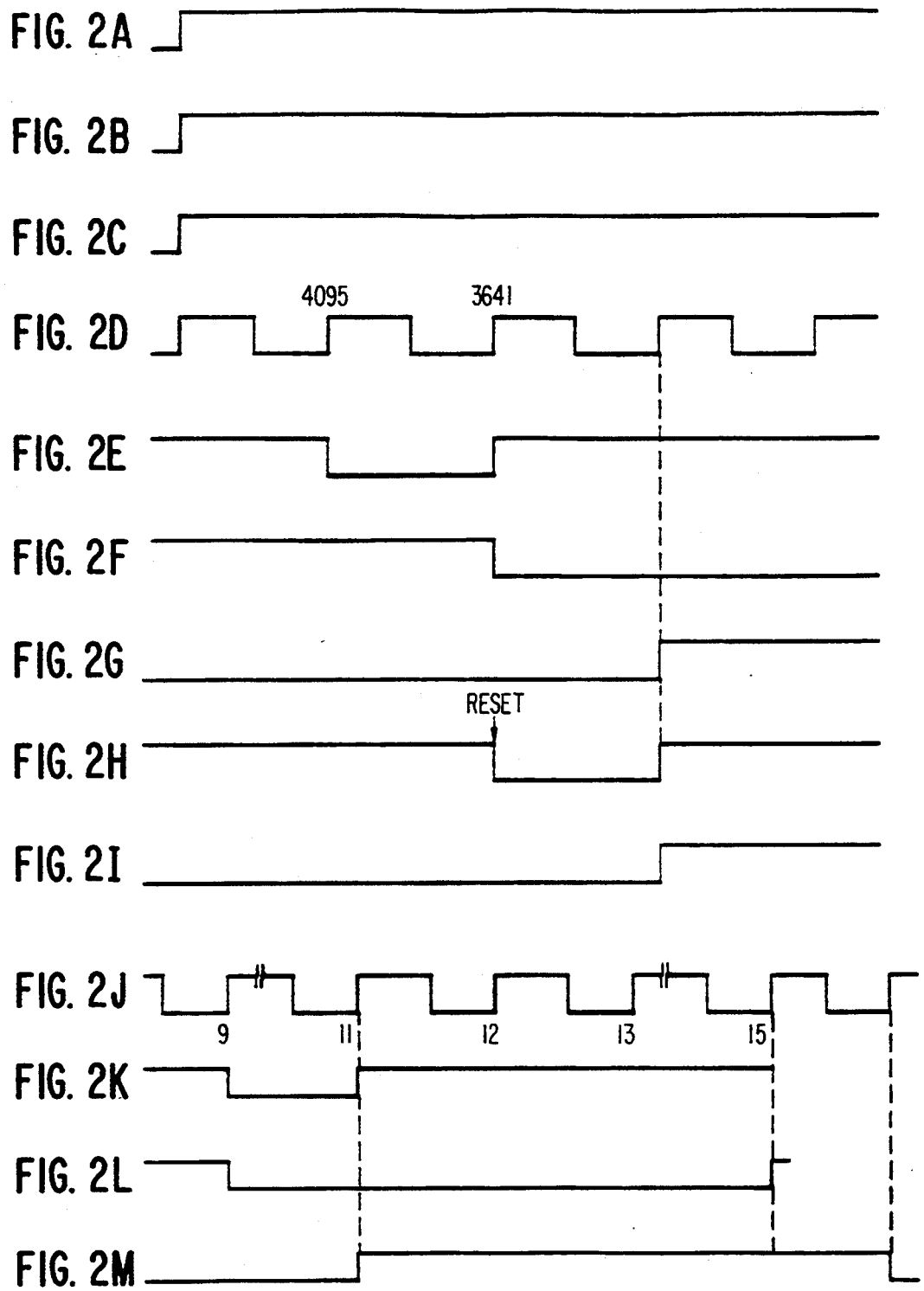

REGENERATING CIRCUIT OF SYNCHRONIZING SIGNALS FOR STANDARD VIDEO SIGNALS

FIELD OF THE INVENTION

The present invention relates to a system for processing digital video signals, and more particularly to, a regenerating circuit of synchronizing signals for standard video signals, in which line-locked and burst locked double horizontal synchronizing signals, horizontal synchronizing signals and vertical synchronizing signals are regenerated from line-locked synchronizing signals, so that burst-locked standard video signals can he used in a line-locking system without any difficulty.

BACKGROUND OF THE INVENTION

In a digital video signal processing system, the line-locked synchronizing signals serve as reference signals for non-standard video signals such as signals of a video tape recorder. Burst-locked signals serve as reference signals for standard video signals such as broadcasting signals satisfying 1, he following formula, $$fsc = (455/2) \times (525/2) \times fv,$$

In the formula, fsc represents the frequency of the burst signal, and fv represents the frequency of the vertical synchronizing signal.

Conventionally, in the digital video processing system for processing standard video signals in which burst-locked signals such as broadcasting signals serve as the reference signals, burst-locked signals are used to prevent errors from occurring during comb-filtering such as when performing 3-dimensional Y/C separation.

However, the burst-locked signals serving as the reference signals for performing the comb-filtering have to be converted to line-locked signals by a sample ratio converting circuit, because line-locked signals ultimately serve as the reference signals for Y/C processing or Y/C interpolation circuits. As a result, the system is increased in size due to the addition of the sample ratio converting circuit.

SUMMARY OF THE INVENTION

The present invention overcomes the above described disadvantages of the conventional techniques and provides a regenerating circuit of synchronizing signals for standard video signals, in which horizontal synchronizing signals, vertical synchronizing signals and double horizontal synchronizing signals are directly generated with the phases of burst signals and line-locking signals being controlled with respect to each other, so that the sample ratio converting circuit is unnecessary and the system can be both miniaturized and produced at a low cost.

The regenerating circuit of synchronizing signals according to the present invention in a digital video signal processing system comprises a comb-filtering circuit for Y/C separating to process burst-locked signals into reference signals and a Y/C processing and Y/C interpolating circuits for processing line-locked signals into reference signals, and further comprises a horizontal synchronizing signal regenerating circuit for regenerating stable horizontal synchronizing signals from input horizontal synchronizing signals, vertical synchronizing signals and quadruple burst signals, a double horizontal synchronizing signal generating circuit connected to an output of the horizontal synchronizing signal regenerating circuit for generating double horizontal synchronizing signals, a horizontal synchronizing signal generating circuit connected to an output of the horizontal synchronizing signal regenerating means for generating horizontal synchronizing signals, a vertical synchronizing signal regenerating circuit for regenerating vertical synchronizing signals From input vertical synchronizing signals, and an output device for commonly providing in-phase line-locked signals and burst-locked signals in synchronization with the horizontal synchronizing signals, vertical synchronizing signals and double horizontal synchronizing signals.

BRIEF DESCRIPTION OF THE DRAWINGS

The above object and other advantages of the present invention sill become more apparent by describing in detail the preferred embodiment of the present invention with reference to the attached drawings, in which:

FIGS. 2A–2M are is a timing chart showing the operation of the regenerating circuit of synchronizing signals for standard video signals according to the present invention.

FIGS. 2A and 2B are vertical synchronizing signals; FIG. 2C is a horizontal synchronizing signal; FIG. 2D is a quadruple burst signal; FIG. 2E is a double horizontal synchronizing signal; FIG. 2F is an NOR signal; FIG. 2G is an output signal; FIG. 2H is a flip flop output signal; FIG. 2I is burst-locked signal; FIG. 2J is a line-locked signal; FIG. 2K is a vertical synchronizing signal; FIG. 2L shows double horizontal synchronizing signals; FIG. 2M shows burst-locked signals.

DESCRIPTION OF THE PREFERRED EMBODIMENT

Figure 1:
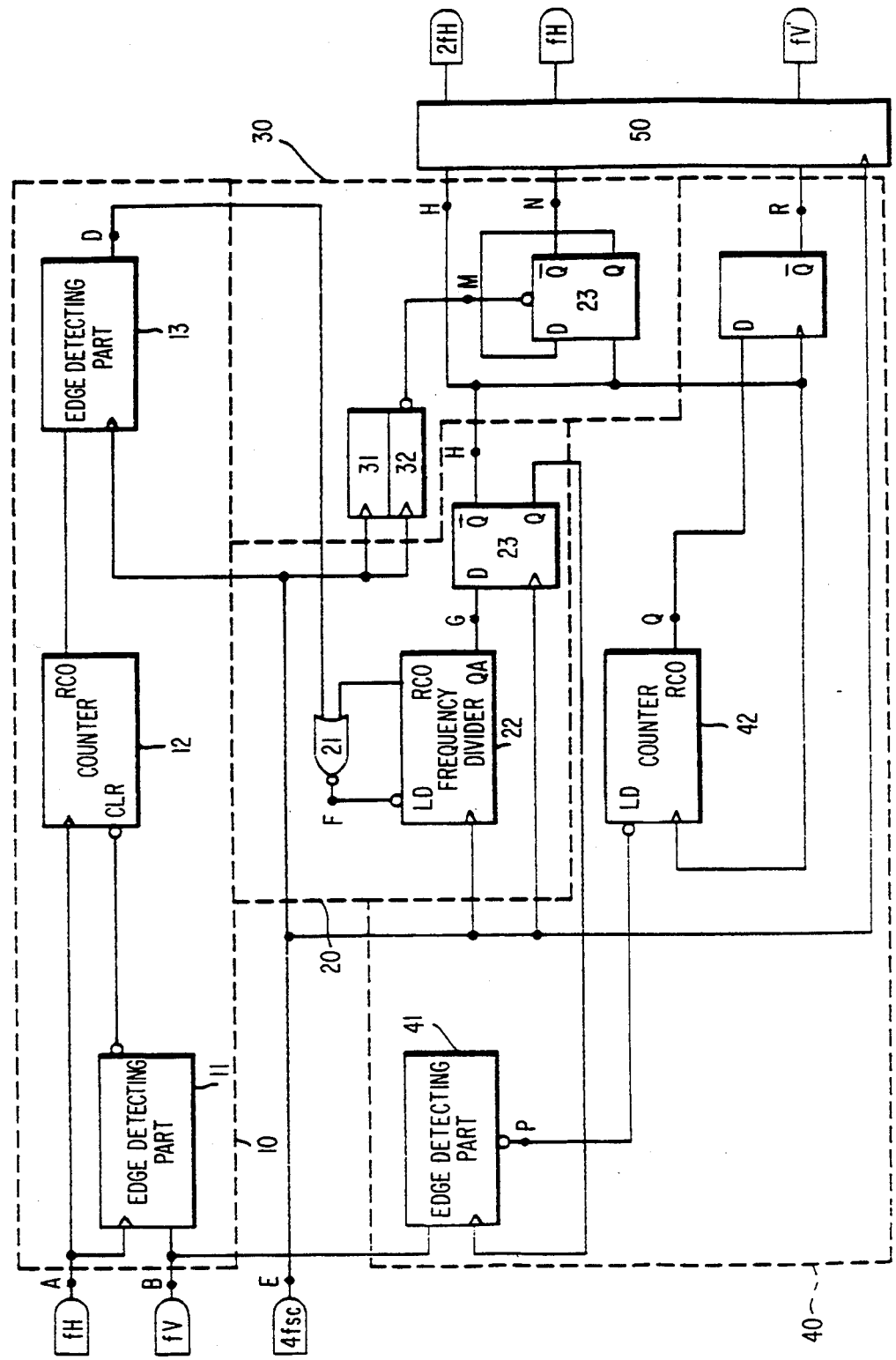
FIG. 1 illustrates in detail a regenerating circuit of synchronizing signals for standard video signals according to the present invention.

FIG. 1 illustrates in detail the circuit arrangement of a regenerating circuit of synchronizing signals for standard video signals according to the present invention. A horizontal synchronizing signal regenerating circuit 10 regenerates stable horizontal synchronizing signals according to input horizontal synchronizing signals fH, vertical synchronizing signals fv and quadruple burst signals 4 fsc.

A double horizontal synchronizing signals generating circuit 20 is connected to an output of the horizontal synchronizing signal regenerating circuit 10. A horizontal synchronizing signal generating circuit 30 generates horizontal synchronizing signals and double horizontal synchronizing signals in the form of burst-locked signals in synchronization with line-locked signals according to the regenerated horizontal synchronizing signals.

A vertical synchronizing signal generating circuit 40 generates vertical synchronizing signals via the input vertical synchronizing signals fv, circuit 40 is also connected to the output of tile circuit 10. These vertical synchronizing signals are generated in the form of burst-locked signals in synchronization with the line-locked vertical synchronizing signals.

A preferred embodiment according to the present invention will be described in further detail below, A first edge detector 11 of the horizontal synchronizing signal regenerating circuit 10 is driven in accordance with input horizontal synchronizing signals fH and detects the rising edges of tile vertical synchronizing signals fv. A counter 12 of the horizontal synchronizing signal regenerating circuit 10 is connected to the detector 11 and is driven in accordance with the input horizontal synchronizing signals fH and thereby counts horizontal synchronizing signals starting from the rising edges of the output signals from the first edge detector 11.

Further, a second edge detector part 13 of the horizontal synchronizing regenerating circuit 10 is connected to an output of the counter 12 and detects the rising edge of an output pulse generated by counting 256 input horizontal synchronizing signals.

A NOR gate 21 of the double horizontal synchronizing signal generating circuit 20 is connected to an output of the second edge detector part 13 of the horizontal synchronizing signal regenerating circuit 10, and the NOR gate 21 combines the output signals from the second edge detector part 13 with output signals from a frequency divider 22 which is driven in accordance with the quadruple burst signals 4 fsc. The frequency divider 22 is connected to the output side of the second edge detector part 13. When the NOR gate 21 outputs signals, a numerical value of 3641 is provided to the frequency divider 22 to divide the quadruple burst signals 4 fsc by 455. The frequency divider 22 is connected to a D flip flop 23 of tile double horizontal synchronizing signal generating circuit 20 to output double horizontal synchronizing signals 2 fH' in the form of burst-locked signals, after frequency-dividing the quadruple burst signals 4 fsc by 455.

The second edge detector part 13 of the horizontal synchronizing signal regenerating circuit 10, is connected to D flip flops 31,32 of the horizontal synchronizing signal generating circuit 30 which are driven by the quadruple burst signals 4 fsc and delayed by 1 clock cycle to generate accurate horizontal synchronizing signals. The D flip flop 32 is connected to a D flip flop 33 of the horizontal synchronizing signal generating circuit 30 for converting the output horizontal synchronizing signals from the B flip flop 32 into burst-locked signals. In addition the third edge detector 41 of the vertical synchronizing signal generating circuit 40 for detecting the rising edge of the input vertical synchronizing signals fv is connected to a counter 42 of the double horizontal synchronizing signal generating circuit 40 to generate vertical synchronizing signals by providing six double horizontal synchronizing signals 2 fH. The counter 42 is connected to a D flip flop 43 of the vertical synchronizing signal generating circuit 40 to burst-lock the output vertical synchronizing signals.

Furthermore, the double horizontal synchronizing signal generating circuit 20, the horizontal synchronizing signal generating circuit 30 and the vertical synchronizing signal generating circuit 40 are connected to a D flip flop 50 for aligning the phases of the double horizontal synchronizing signals 2 fH', the horizontal synchronizing signals fH' and the vertical synchronizing signals fv upon providing them.

FIG. 2 is a timing chart showing in detail the operation of the synchronizing signal regenerating circuit for standard video signals according to the present invention.

Now the operations of the preferred embodiment of the present invention will be described in detail while referring to FIG. 1. Rising edges of input vertical synchronizing signals fv are detected by first edge detector 11 of a horizontal synchronizing regenerating circuit 10, and the input vertical synchronizing signals fv next are counted by the counter 12 of the horizontal synchronizing signal regenerating circuit 10. The counter 12 produces output signals when the counting value reaches 256. Then the rising edges of the output signals from the counter 12 are detected by the second edge detector 13 of the horizontal synchronizing signal regenerating circuit 10. When the quadruple burst signals 4 fsc are Frequency-divided into 455, a NOR gate 21 of a double horizontal synchronizing signal generating circuit 20 outputs low signals.

During the period in which the quadruple burst signals 4 fsc are counted up to 455, the frequency divider 22 of the double horizontal synchronizing signal generating circuit 20 produces an output to perform one cycle in accordance with the output signals from the NOR gate 21. At this time, the output signals from the frequency divider 22 are provided after being burst-locked and delayed by one clock cycle. The output signals from the D flip flop 23 become the double horizontal synchronizing signals 2 fH' which can be used in the Y/C processing unit or the Y/C interpolating unit.

Meanwhile, the output signals from the second edge detector 13 of the horizontal synchronizing signal regenerating circuit 10 are supplied to the D flip flops 31,32 of the horizontal synchronizing signal generating circuit 30 and are delayed by one clock cycle. Then the delayed signals are provided in the form of burst-locked signals after being burst-locked by the D flip flop 33 of the horizontal synchronizing signal generating circuit 30. The output signals from the D flip flop 33 become the horizontal synchronizing signals which can be used in the Y/C processing unit and the Y/C interpolating unit.

The rising edges of the vertical synchronizing signals fv, in response to inverted output signals $\overline{2\,fH}$ from the double horizontal synchronizing signal generating circuit 20, are detected by the third edge detector 41 of the vertical synchronizing signal generating circuit 40. After the detection of the rising edge of the vertical synchronizing signals, the output signals from the third edge detector 41 are counted by the counter 42 of the vertical synchronizing signal generating circuit 40. The counter 42 inverts the output when the count valve reaches 6, and the inverted signals are delayed by one clock cycle by the D flip flop 43 prior to being output.

The output signals from the D flip flop 43 are the burst-locked vertical synchronizing signals fv. Furthermore, the horizontal synchronizing signals fH', the double horizontal synchronizing signals 2 fH' and the vertical synchronizing signals fv' are phase-shaped by the flip flop device 50 before being output in the for of line-locked and burst-locked signals.

The above described operations will be described in further detail while referring to FIGS. 2. First, as shown in FIG. 2A and 2B, as soon as the horizontal synchronizing signals fH and the vertical synchronizing signals fv are provided, the rising edges of the input vertical synchronizing signals fv are detected by the first edge detector 11 of the horizontal synchronizing signal regenerating part 10, and the 256 rising edges of the horizontal synchronizing signals fit are counted by the counter 12 of the horizontal synchronizing signal regenerating circuit 10 to generate high level signals, as shown in FIG. 2C. Under this condition, the output rising edge from the counter 12 in FIG. 2C is detected when the quadruple burst signal rises, as shown in FIG. 2D.

The signal in FIG. 2F is produced from the frequency divider 22 of the double horizontal synchronizing signal generating circuit 20, after the quadruple burst signal is frequency-divided into 455 based on the output signal in FIG. 2E from the NOR gate 21 of the double horizontal synchronizing signal generating circuit 20, and driven by the quadruple burst signal 4 fsc in FIG. 2G. The output signal of FIG. 2F from the frequency divider 22 of the double horizontal synchronizing signal generating circuit 20 is delayed by one clock cycle by the B flip flop 23 of the double horizontal synchronizing signal generating circuit 20, and provided in the form of the signal in FIG. 2G.

The output signal from FIG. 2C from the horizontal synchronizing signal regenerating circuit 10 is delayed by two clocks cycle by the D flip flops 31,32 of the horizontal synchronizing signal generating circuit 30, and then, supplied to the D flip flop 33 of the horizontal synchronizing signal generating circuit 30 in the form of the signal in FIG. 2H. The output signal from FIG. 2H of the D flip flop 32 is converted into a burst-locked signal by the D flip flop 33 of the horizontal synchronizing signal generating circuit 30, and provided in the form of the signal in FIG. 2I, while the output signal shown in FIG. 2I from the D flip flop 33 is phase-shaped by the flip flop device 50, before being outputted in the form of a horizontal synchronizing signal which is equivalent to a line-locked signal.

Meanwhile, the vertical synchronizing signal of FIG. 2B is inputted and driven by the output double horizontal synchronizing signal $\overline{2fH'}$ in the form of the signal in FIG. 2G. The rising edge of this signal fv is detected by the third edge detector 41 of the vertical synchronizing signal generating circuit 40, before being output in the form of the signal of FIG. 2K. Under this condition, the rising edges of the output vertical synchronizing signals of the third edge detector 41 in the form of the signal of FIG. 2K are counted by the counter 42 of the vertical synchronizing signal generating circuit 40 until the double horizontal synchronizing signals 2 fH are counted up to the value of 6, before being provided in the form of the signals of FIG. 2L.

The counter 42 produces its output after counting six rising edges of the input vertical synchronizing signals. The output signals in FIG. 2L from the counter 42 of the vertical synchronizing signal generating circuit 40 are burst-locked by the D Flip flop 43 of the vertical synchronizing signal generating circuit 40, and provided in the form of the signals in FIG. 2M.

The synchronizing signals fH',2 fH',fv' of the double horizontal synchronizing signal generating circuit 20, the horizontal synchronizing signal generating circuit 30 and the vertical synchronizing signal generating circuit 40 are phase-shaped by the flip flop device 50, and line-locked and burst-locked before being provided as the horizontal synchronizing signals, the vertical synchronizing signals and the double horizontal synchronizing signals.

According to the present invention as described above, a line-locking is carried out by a horizontal synchronizing signal, a vertical synchronizing signal and a quadruple burst signal and, at the same time, the line-locking signal is generated and provided as the synchronizing signal of the burst signal which can be applied to all kinds of digital image processing systems. Furthermore because burst-locked synchronizing signals are regenerated from the input standard video signals simultaneously with the line locking, eliminating the sample ratio converting circuit for converting the burst signals into line-locking signals, can be eliminated from a block requiring line locking. Consequently, the total system light can be constructed as a miniaturized circuit which is in weight and compact.

What is claimed is:

1. A regenerating circuit of synchronizing signals for a digital video signal processing system including a Y/C separating device wherein burst-locked signals serve as reference signals, and a Y/C processing device and a Y/C interpolating device wherein line-locked signals serve as reference signals, comprising:
   stable horizontal synchronizing signal regenerating means for regenerating stable horizontal synchronizing signals from input horizontal synchronizing signals (fH), input vertical synchronizing signals (fv) and input quadruple burst signals (4 fsc);
   means connected to said stable horizontal synchronizing signal regenerating means for generating double horizontal synchronizing signals according to the input quadruple burst signals (4 fsc);
   means connected to said stable horizontal signal regenerating means for generating horizontal synchronizing signals according to the input quadruple burst signals (4 fsc);
   means for generating second vertical synchronizing signals according to the input vertical synchronizing signals; and
   means for commonly providing line-locked and burst-locked horizontal synchronizing, vertical synchronizing signals and double horizontal synchronizing signals in synchronization with the input horizontal synchronizing signals, said second vertical synchronizing signals and said double horizontal synchronizing signals.

2. The circuit according to claim 1, wherein said providing means comprises means for simultaneously performing burst-lockings and line-lockings and for phase-shaping said horizontal synchronizing signals, said double horizontal synchronizing signals and said vertical synchronizing signals.

3. The circuit according to claim 1, wherein said stable horizontal synchronizing signal regenerating means comprises:
   a first edge detector driven in response to said input horizontal synchronizing signals for detecting rising edges of the input vertical synchronizing signals;
   a counter connected to an output terminal of said first edge detector for counting the number of the input horizontal synchronizing signals so as to find stable reference horizontal synchronizing signals; and
   a second edge detector connected to an output terminal of said counter for detecting rising edges of the input horizontal synchronizing signals in response to a count value of 256 at said counter.

4. The circuit according to claim 1, wherein said means for generating double horizontal synchronizing signals comprises:
   a NOR gate for combining output signals of an edge detector of said stable horizontal synchronizing signal regenerating means and carrying signals appearing after frequency-division of said input quadruple burst signals by 455;
   a frequency divider connected to an output terminal of said NOR gate, and driven in response to logical output signals of said NOR gate for frequency dividing the input quadruple burst signals by 455 to produce frequency divided output signals and for generating said carrying signals; and a D flip flop connected to an output terminal of said frequency divider for burst-locking the frequency-divided output signals of said frequency divider.

5. The circuit according to claim 1, wherein said means for generating vertical synchronizing signals comprises:

a third edge detector for detecting rising edges of said input vertical synchronizing signals, said third edge detector being driven by inverted ones of said double horizontal synchronizing signals;

a counter connected to an output terminal of said third edge detector for counting said inverted ones of said double horizontal synchronizing signals; and a D flip flop connected to an output terminal of said counter to burst-lock the vertical synchronizing signals based on a counting value reaching 6 within said counter.

6. The circuit according to claim 1, wherein said means for generating horizontal synchronizing signals further comprises:

first and second D flip flops connected to side an output terminal of an edge detector for receiving edge detector output signals and for time delaying said edge detector output signals by one clock cycle; and a third D flip flop connected to the output of said second D flip flop for frequency dividing the double horizontal synchronizing signals by one half and for burst-locking said horizontal synchronizing signals.

7. A regenerating circuit of synchronizing signals for a digital video signal processing system including a Y/C separating device wherein burst-locked signals serve as reference signals, and a Y/C processing device and a Y/C interpolating device wherein line-locked signals serve as reference signals, comprising:

first means for regenerating stable horizontal synchronizing signals from input horizontal synchronizing signals, input vertical synchronizing signals and input quadruple burst signals;

second means connected to said first means for receiving said stable horizontal synchronizing signals for generating double horizontal synchronizing signals based on said input horizontal synchronizing signals;

third means connected to said first means for generating horizontal synchronizing signals based on said input horizontal synchronizing signals;

fourth means for generating vertical synchronizing signals based on said input vertical synchronizing signals; and fifth means for aligning respective phases of said horizontal synchronizing signals, said vertical synchronizing signals and said double horizontal synchronizing signals.

8. The circuit according to claim 7, wherein said fifth means comprises means for concurrently burst-locking, line-locking and aligning said horizontal synchronizing signals, said double horizontal synchronizing signals and said vertical synchronizing signals.

9. The circuit according to claim 7, wherein said first means comprises:

a first edge detector for detecting rising edges of the input vertical synchronizing signals in response to said input horizontal synchronizing signals;

a counter operatively connected to an output terminal of said first edge detector for counting the number of the input horizontal synchronizing signals so as to find stable reference horizontal synchronizing signals; and a second edge detector connected to an output terminal of said counter for detecting rising edges of the input horizontal synchronizing signals in response to a count value of 256 at said counter.

10. The circuit according to claim 7, wherein said first means comprises an edge detector and wherein said second means comprises:

a NOR gate having first and second input terminals for receiving first input signals produced by said edge detector based on said input horizontal synchronizing signals and second input signals generated in response to frequency dividing said input quadruple burst signals by 455, respectively, and for producing a logical output signal;

a frequency divider receiving said logical output signal from said NOR gate and said input quadruple burst signals for frequency dividing said input quadruple burst signals by 455 to produce frequency divided output signals and for generating said second input signals; and a D flip flop connected to an output terminal of said frequency divider for burst-locking the frequency-divided output signals of said frequency divider.

11. The circuit according to claim 7, wherein said fourth means comprises:

an edge detector for detecting rising edges of said input vertical synchronizing signals, said edge detector being driven by inverted ones of said double horizontal synchronizing signals;

a counter connected to the output side of said edge detector for counting said inverted ones of said double horizontal synchronizing signals; and a D flip flop connected to an output terminal of said counter for burst-locking said vertical synchronizing signals.

12. The circuit according to claim 7, wherein said first means comprises an edge detector and wherein said third means comprises:

first and second flip flops connected to an output terminal of said edge detector for receiving edge detector output signals and for time delaying said edge detector output signals by one clock cycle; and a third flip flop connected to the output of said second flip flop for frequency dividing said double horizontal synchronizing signals by one half so as to provide said horizontal synchronizing signals and for burst-locking said horizontal synchronizing signals.

* * * * *